Figure 1:
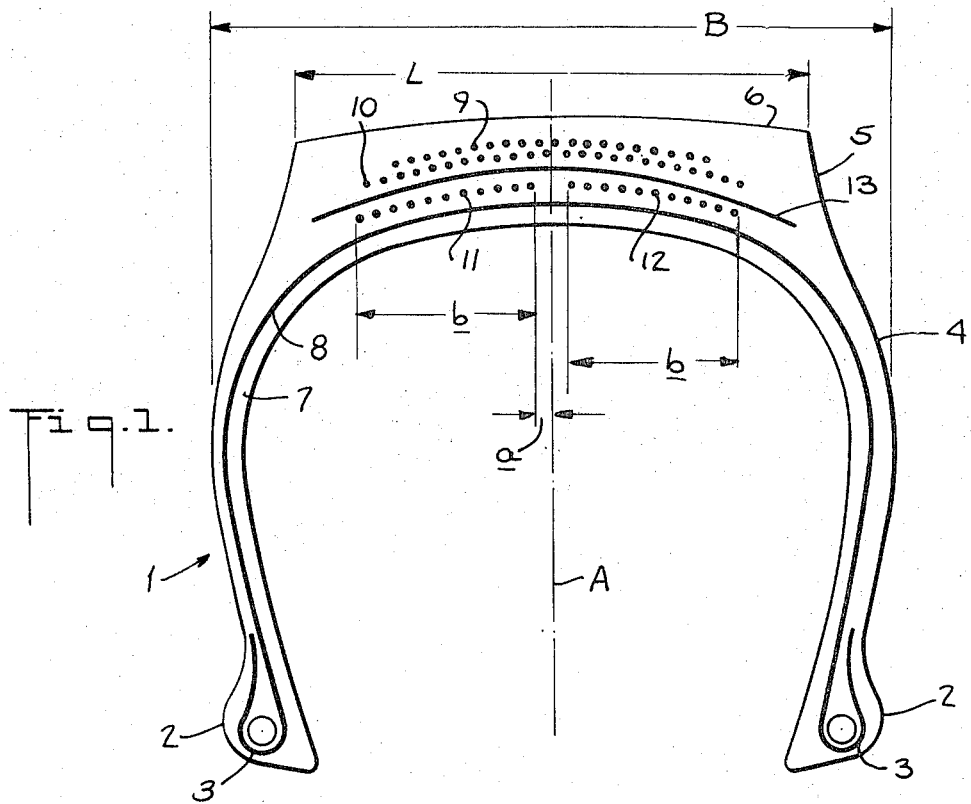

# United States Patent [19]

Bertrand

[11] 3,842,884
[45] Oct. 22, 1974

[54] RADIAL PLY TIRE WITH REINFORCING BELT

[75] Inventor: Marcel J. Bertrand, Grivegnee-Liege, Belgium

[73] Assignee: Uniroyal Aktiengesellschaft, Aachen, Germany

[22] Filed: Apr. 19, 1973

[21] Appl. No.: 352,800

Related U.S. Application Data

[63] Continuation of Ser. No. 206,424, Dec. 9, 1971, abandoned.

[30] Foreign Application Priority Data

Dec. 21, 1970 Germany.............................. 2062941

[52] U.S. Cl...................... 152/361 R, 152/361 DM
[51] Int. Cl.............................................. B60c 9/18
[58] Field of Search.......... 152/359, 361 R, 361 FP, 152/361 DM, 175, 176, 187

[56] References Cited
UNITED STATES PATENTS

| | | | |
|---|---|---|---|
| 2,493,614 | 1/1950 | Bourdon | 152/361 R |
| 3,224,481 | 12/1965 | Lugli | 152/176 |
| 3,386,487 | 6/1968 | Massoubre | 152/361 DM |
| 3,677,319 | 7/1972 | Mirtain | 152/361 DM |

Primary Examiner—M. Henson Wood, Jr.
Assistant Examiner—George H. Libman
Attorney, Agent, or Firm—Charles A. Blank

[57] ABSTRACT

A radial ply tire which minimizes lateral forces produced in the tire, which are usually transmitted over the carcass to the axis of the vehicle, while maintaining radial flexibility of the tire. The tire includes a pair of reinforcing strips between the carcass and the tread spaced on both sides of the equator of the tire and extending toward the shoulders. These reinforcing strips are covered by a reinforcing strip having radial cords.

7 Claims, 2 Drawing Figures

PATENTED OCT 22 1974 3,842,884

RADIAL PLY TIRE WITH REINFORCING BELT

This is a continuation of application Ser. No. 206,424, filed Dec. 9, 1971, now abandoned.

The invention relates to pneumatic tires for motor vehicles, for example, trucks. More particularly, the invention relates to tires of the type comprising a radial carcass with at least one ply extending from one bead to the other, with its cords running substantially at a right angle to the center of the tire circumference, that is, the equator of the tire, and strip-shaped reinforcing inserts of several parts between the carcass and the tread.

As used herein, the term "cords" is intended to include threads, filaments, yarns, wires, cables, bands, braids, and the like.

Radial carcasses are used in the construction of so-called belted tires, in which the cords of the belt layer which surrounds the carcass layer are disposed at a small angle with respect to the center of the tire circumference. Belted tires of this type, in addition to a large number of known driving advantages, have the particular advantage of a low resistance to rolling and reduced tread wear.

In producing pneumatic tires of this type, the attempt is always made to utilize the smallest possible number of structural parts and structural materials, and to keep the weight of the tire low. This task still presents certain difficulties, particularly in the production of pneumatic tires for trucks, since these tires must support substantially greater loads. Added to this is the fact that truck tires tend to develop more heat, and exhibit correspondingly greater wear.

A pneumatic tire for motor vehicles with a radial carcass and a reinforcing insert of high tensile strength in the center of the tire is known, wherein in order to prevent the development of breaks in the fabric on the inside of the carcass, the inner layer of the reinforcing insert is divided into two strips which are some distance apart from one another in the transverse direction. These two strips are located in the area of the edges of the reinforcing insert on both sides, and the cords of these two strips form an angle of 60° to 90° with the direction of the tire circumference. These strips may be located inside the carcass ply. However, they may also be disposed between the carcass ply and the belt reinforcements.

In another known tire of the radial carcass type, special shoulder strips made of parallel cords are arranged between the tire plies and the reinforcing belt. These cords run at an angle of about 40° to 70° with respect to the center of the tire circumference, reinforce the edges of the belt, and together with the belt, form a bridge which is supposed to prevent the individual layers from separating from one another, especially at high speeds.

Similar shoulder strips have also been included in pneumatic tires especially designed for cross-country vehicles. In these tires, shoulder strips are arranged over the belt reinforcements in the shoulder areas, the cords of these shoulder strips running practically parallel to the center of the tire circumference, in order in this manner to reinforce the shoulders and improve the grip, particularly of the portion of tread located in the shoulder areas.

In contrast, it is an object of the present invention to provide a pneumatic tire of the radial ply type that does not exhibit the lateral force effects on the axle of the vehicle which generally occur during the rolling of belted tires, or only exhibits such force effects to a slight, predetermined extent, while conserving flexibility of the tread in the radial direction.

This problem is solved in accordance with the invention in that on both sides of the center of the tire circumference a pair of shoulder strips are provided extending in the direction of the tire shoulder and are entirely covered by a radial strip whose cords run at substantially a right angle to the center of the tire circumference. Thus, the cords of the radial strip also run practically parallel to the cords of the individual layers of the carcass plies. As a result, the lateral force effects produced in the tread area, which are usually transmitted over the carcass to the axle of the vehicle, are reduced, so that these force effects only occur to a slight extent, or no longer occur on the axis of the vehicle. In order to prevent the flexural behavior of the tread in the radial direction from being unfavorably influenced by the additional radial strip, the radial strip is placed outside the two shoulder strips Above or below the reinforcing inserts comprising the shoulder strips and the radial strip a reinforcing belt is provided, whose cords run at a small angle of between 0° and 20° with respect to the center of the tire circumference. The individual shoulder strips extending in the direction of the tire shoulders advantageously possess an intermediate space at the equator of the tire, preferably a distance from the center of the tire circumference of 2.5 millimeters to 15 millimeters. The width of each of the shoulder strips preferably amounts to one quarter of the total width of the tire.

The flexibility of the new pneumatic tire can be further modified by the fact that the cords of the radial strip have a higher degree of twisting or torsion than the cords of the carcass ply and the other inserts in the tire. As a result of the higher degree of twisting, for example, a substantial reduction in flexural rigidity is achieved.

For a better understanding of the present invention, together with other and further objects thereof, reference is had to the following description taken in connection with the accompanying drawings and its scope will be pointed out in the appended claims.

Figure 2:
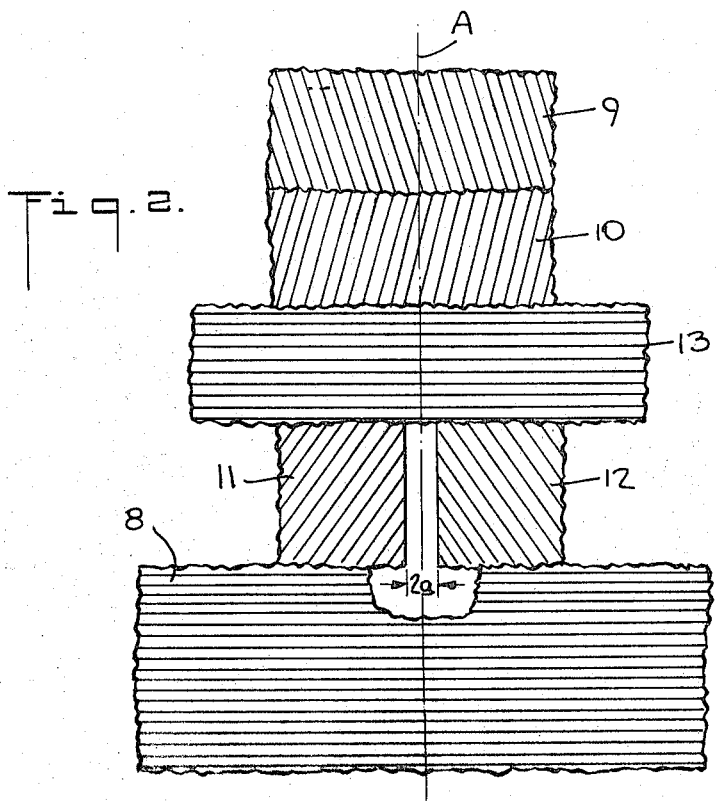

Referring now to the drawings:

FIG. 1 is a cross-sectional view, partly schematic, of a tire constructed in accordance with the invention; and FIG. 2 is a fragmentary top view of the tire, partly schematic, with individual layers broken away in order to represent the directions of the cords in the various inserts.

The tire 1, which is particularly designed for trucks, has a carcass 7, in which a single radial ply 8 is disposed, whose cords run substantially at a right angle to the equator or center A of the tire circumference and to the bead edges 2 of the tire. The single carcass ply 8 is wrapped around the bead rings 3 in the area of the bead edges.

Shoulder strips 11 and 12 are disposed outside the carcass ply 8. Each shoulder strip is at a distance $a$ preferably between 2.5 millimeters and 15 millimeters from the center A of the tire circumference, thus a distance of 5 millimeters to 30 millimeters from one another. Each of the shoulder strips 11 and 12, which are located in the same layer level of the tire, has a width $b$, which preferably corresponds approximately to one quarter of the total tire width B, measured over the widest area of the tire sidewalls 4. These shoulder strips 11 and 12 contain cords, which preferably run opposite to one another and preferably form angles of between 50 degrees and 80 degrees with the center A of the tire circumference.

The two shoulder strips 11 and 12 are entirely covered by a wide radial strip 13. The width of this strip preferably corresponds to the width L of the tread 6 of the tire. Thus, the ends of the radial strip 13 project into the shoulder area 5 of the tire. This strip 13 contains cords which are substantially perpendicular to the center of the tire circumference, and thus substantially parallel to the cords of the carcass ply 8. The additional radial strip 13 influences the flexibility of the tire in the radial direction. The flexural rigidity of the tire in the radial direction can be reduced, for example, if the individual cords of the radial strip 13 have greater twisting or torsion than the cords of the carcass ply 8 or the other inserts 9 and 10 which will be described. The radial strip 13 preferably bends more easily than the carcass ply 8 and the other inserts 9 and 10.

In the example shown, two additional inserts 9 and 10 comprising the reinforcing belt are disposed, outside the radial strips. Their cords are slanted in opposite directions and in a known manner preferably form a small angle between 0° and 20° with the center A of the tire circumference.

As FIG. 1 in particular shows, the radial strip 13 together with the shoulder strips 11 and 12 form a bridge-like structure, which supports the belt inserts 9 and 10, and with reference to the carcass, takes up the force effects proceeding from the belt inserts. This bridge unit consisting of strips 11, 12 and 13, due to the radial strip as well as the distance between the shoulder strips in the region of the center of the tire, possesses a special, novel flexibility, which can be determined in advance with good accuracy.

The lateral forces of the rolling tire proceeding from belt inserts 9 and 10 are taken up by the unit mentioned, consisting of shoulder strips 11, 12 and radial strip 13, and are greatly reduced due to the design of this unit. However, if some lateral force is still present, it can be predetermined and specified to a great extent by selecting the width of the shoulder strips 11 and 12, as well as by selecting the distance $a$ of the shoulder strips from the center of the tire circumference, and by the orientation of the cords of the shoulder strips.

Instead of the manner shown in the example, the belt reinforcements 9 and 10 can also be arranged below the unit consisting of shoulder strips 11 and 12, and radial strip 13. Such an arrangement would have the advantage that the lateral force effect practically cannot form at all, since the tread rubber is separated from the belt inserts. As is known, the lateral force primarily comes from the arrangement and orientation of the cords on the radially outermost belt layer.

The threads of shoulder strips 11 and 12 may also exhibit an orientation opposite to that shown in FIG. 2.

Suitable materials for the reinforcing unit formed by the shoulder strips 11 and 12 as well as by the radial strip 13 include, for example, calendered wires or cables made of steel, or other materials similar in physical properties to steel, such as glass fibers and plastics. Although the carcass ply 8, reinforcing strips 11, 12 13 and belt inserts 9 and 10 appear spaced radially from one another in the schematic view of FIG. 1 for clarity, it will be understood that the strips 11, 12, 13 and belt inserts 9 and 10 are laid one upon the other on the carcass ply 8 and under the tread layer. Also, the cords of carcass ply 8 preferably are contiguous although they are shown spaced in the schematic view of FIG. 2 for clarity. The same is true of the cords of strips 11, 12, 13 and belt inserts 9 and 10.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A pneumatic tire comprising: a carcass including a pair of beads and at least one ply having cords extending from one bead to the other and disposed substantially radially of the tire;
   a reinforcing belt extending substantially circumferentially of the tire over said carcass;
   tread, shoulder and sidewall portions of elastomeric material over said carcass;
   a pair of reinforcing strips in the same layer between said carcass and said tread portion and spaced on both sides of the equator of the tire and extending toward said shoulder portions, each strip being on only one side of said equator and each strip extending substantially circumferentially of the tire and having cords obliquely disposed with respect to the equator of the tire and which slant in opposite directions with respect to the equator of the tire said spaced reinforcing strips being each spaced a distance between 2.5 millimeters and 15 millimeters from said equator of the tire, said spaced reinforcing strips being each spaced a distance between 2.5 millimeters and 15 millimeters from said equator of the tire;
   and a reinforcing strip unincorporated in said reinforcing belt and in intimate contact with and entirely covering said pair of reinforcing strips and having cords disposed substantially radially of the tire at a greater angle with respect to said equator of the tire than said obliquely disposed cords of said pair of reinforcing strips.

2. A pneumatic tire in accordance with claim 1 in which said reinforcing belt comprises a pair of inserts having cords which slant in opposite directions at angles between 0° and 20° relative to said equator of the tire.

3. A pneumatic tire in accordance with claim 1 in which each of said pair of spaced reinforcing strips has a width equal to approximately one quarter of the width of the tire.

4. A pneumatic tire in accordance with claim 1 in which said cords of said pair of spaced reinforcing strips slant in opposite directions at angles between 50° and 80° with respect to said equator of the tire.

5. A pneumatic tire in accordance with claim 2 in which said reinforcing strip having cords disposed substantially radially of the tire bends more easily than said carcass ply and said inserts of said reinforcing belt.

6. A pneumatic tire comprising:

a carcass including a pair of beads and at least one ply having cords extending from one bead to the other and disposed substantially radially of the tire;

a reinforcing belt extending substantially circumferentially of the tire over said carcass comprising a pair of inserts having cords which slant in opposite directions at angles between 0° and 20° relative to the equator of the tire;

tread, shoulder and sidewall portions of elastomeric material over said carcass;

a pair of reinforcing strips between said carcass and said tread portion and spaced on both sides of said equator of the tire and extending toward said shoulder portions, each strip extending substantially circumferentially of the tire and having cords obliquely disposed with respect to said equator of the tire;

and a reinforcing strip entirely covering said pair of reinforcing strips and having cords disposed substantially radially of the tire, said cords of said covering reinforcing strip having greater torsion than said cords of said pair of inserts of said reinforcing belt.

7. A pneumatic tire comprising:

a carcass including a pair of beads and at least one ply having cords extending from one bead to the other and disposed substantially radially of the tire;

a reinforcing belt extending substantially circumferentially of the tire over said carcass comprising a pair of inserts having cords which slant in opposite directions at angles between 0° and 20° relative to the equator of the tire;

tread, shoulder and sidewall portions of elastomeric material over said carcass;

a pair of reinforcing strips between said carcass and said belt spaced on both sides of said equator of the tire and extending toward said shoulder portions, each strip having a width equal to approximately one quarter of the width of the tire and extending substantially circumferentially of the tire and having cords which slant in opposite directions at angles between 50 and 80° with respect to said equator of the tire said spaced reinforcing strips being each spaced a distance between 2.5 millimeters and 15 millimeters from said equator of the tire; reinforcing strips and having cords disposed substantially radially of the tire at a greater angle with respect to said equator of the tire than said slanted cords of said pair of reinforcing strips.

* * * * *

PO-1050
(5/69)

UNITED STATES PATENT OFFICE
CERTIFICATE OF CORRECTION

Patent No. 3,842,884     Dated October 22, 1974

Inventor(s)     Marcel J. Bertrand

It is certified that error appears in the above-identified patent and that said Letters Patent are hereby corrected as shown below:

Column 4, line 36 for "tire said" read --tire, said--

Column 4, lines 39-42 for "tire, said spaced...of the tire;"

read --tire;--

Column 6, line 19 for "tire said" read --tire, said--

Column 6, line 22 before "reinforcing strips"

read--and a reinforcing strip
                               entirely covering said pair of--

Signed and sealed this 4th day of March 1975.

(SEAL)
Attest:

RUTH C. MASON
Attesting Officer

C. MARSHALL DANN
Commissioner of Patents
and Trademarks